Sept. 29, 1959 M. B. CONRAD 2,906,492
VALVES
Filed June 1, 1951 3 Sheets-Sheet 1
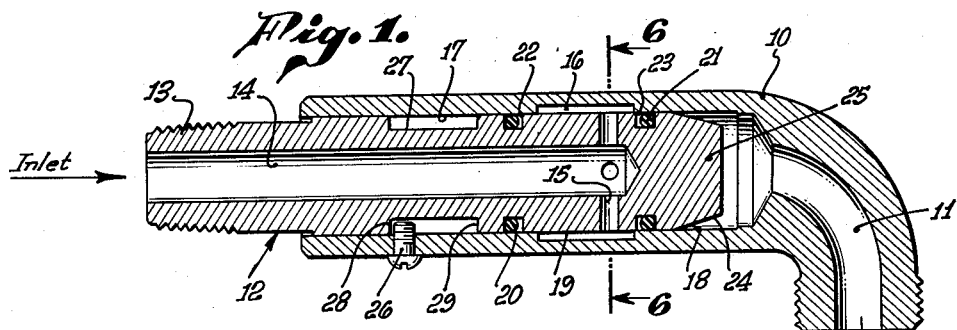
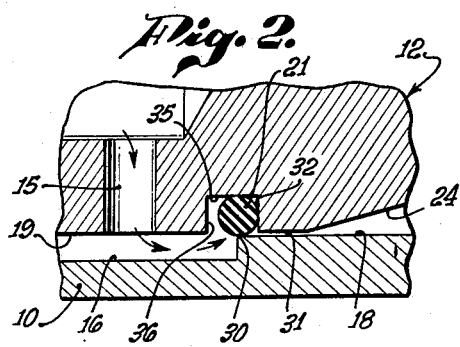 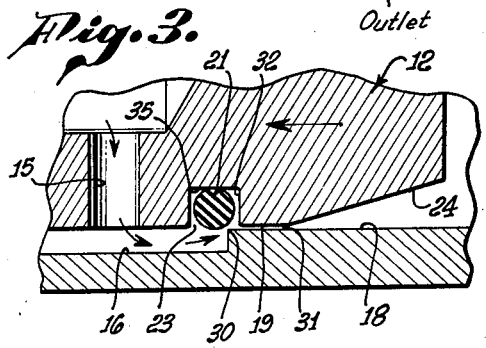
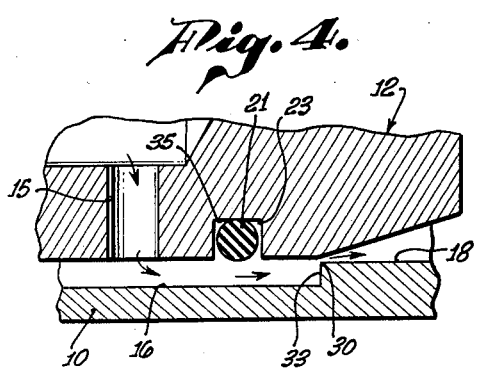 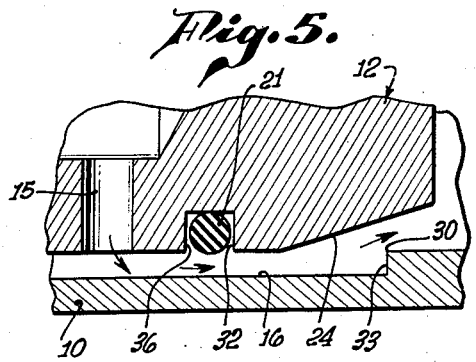
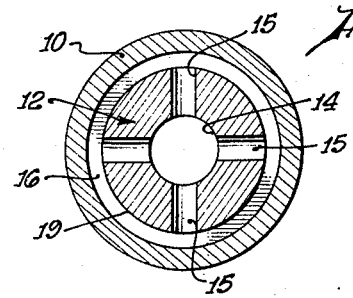
MARTIN B. CONRAD,
INVENTOR.
BY
Mellin and Hanscom
ATTORNEYS

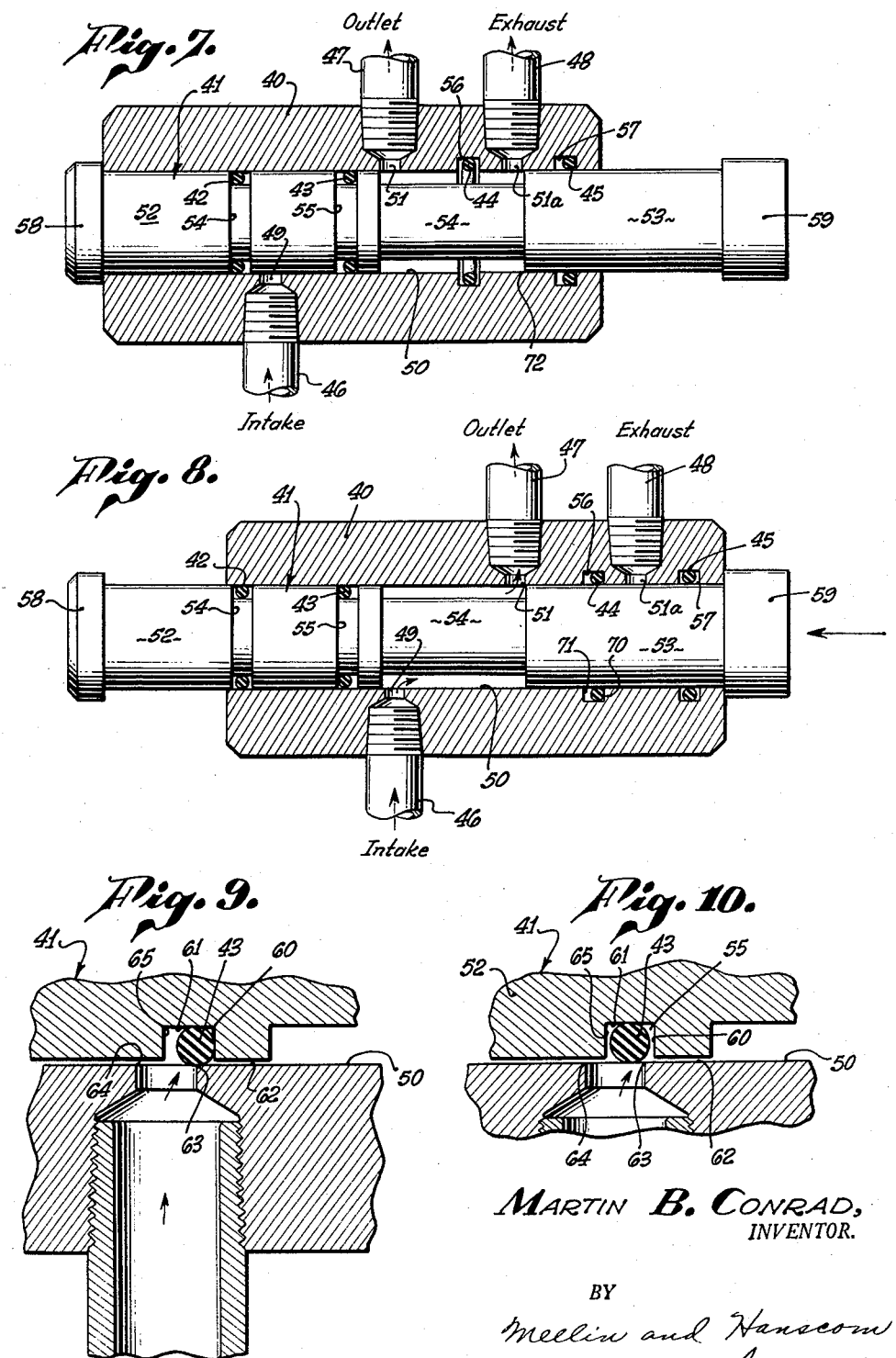

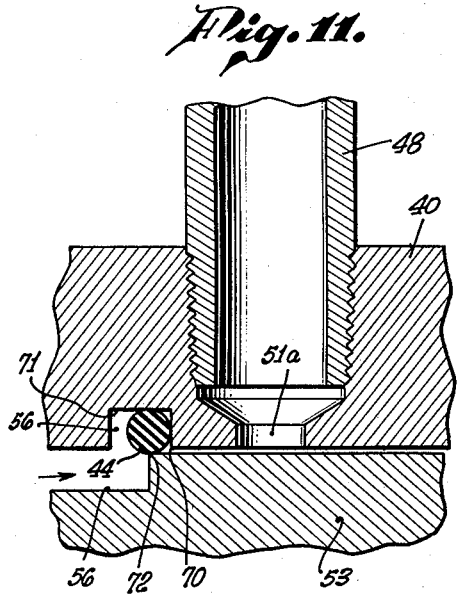
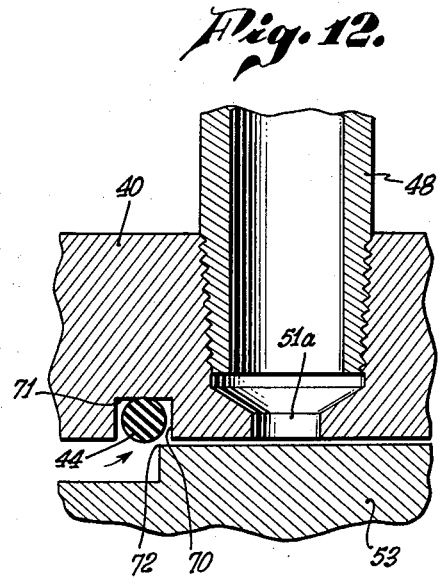
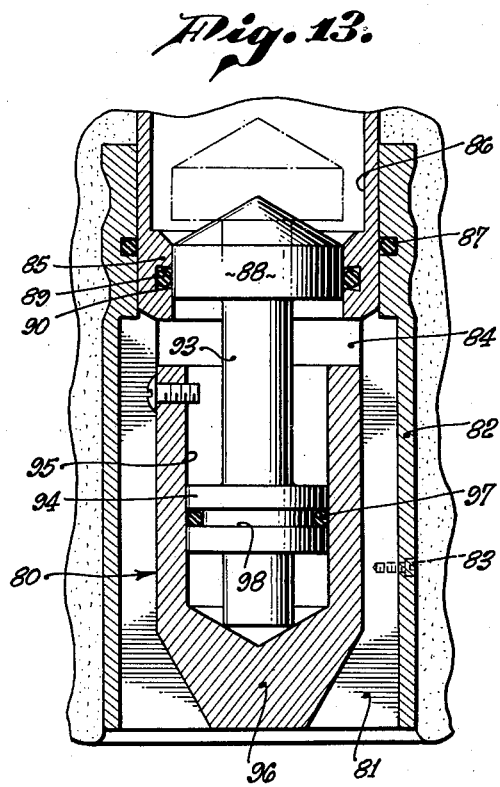
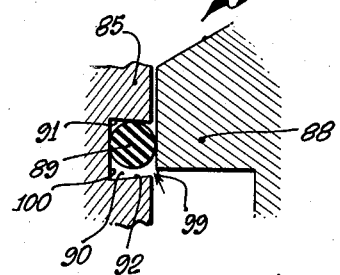
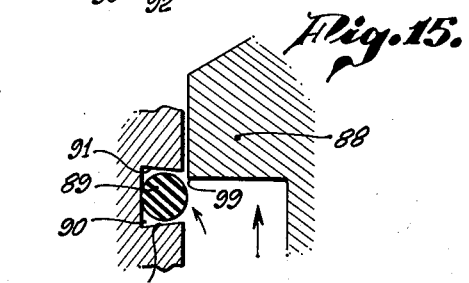
MARTIN B. CONRAD,
INVENTOR.
BY
Mellin and Hanscom
ATTORNEYS

United States Patent Office 2,906,492
Patented Sept. 29, 1959

2,906,492

VALVES

Martin B. Conrad, Downey, Calif., assignor to Baker Oil Tools, Inc., Vernon, Calif., a corporation of California Application June 1, 1951, Serial No. 229,353

8 Claims. (Cl. 251—325)

The present invention relates to valves for controlling flow of fluids.

This application is a continuation-in-part of my application for "Apparatus for Automatically Filling Well Casing," Serial No. 197,542, filed November 25, 1950, now Patent No. 2,718,265, granted Sept. 20, 1955.

Valve devices ordinarily embody seal rings for preventing leakage of fluid. These seal rings are usually located in ring grooves, from which they may be displaced inadvertently by fluid pressure in the valves upon being shifted from and to engagement with their companion valve seats, or across openings through which fluid can flow. Heretofore, the seal rings have been so arranged with respect to their companion seats or fluid openings and the valve inlets and outlets as to tend to be blown or forced out of their grooves, or fluid cut by the inlet pressure at their initial point of engagement with, or final point of disengagement from, the companion valve seats, or upon being relatively shifted across the openings.

An object of the present invention is to prevent displacement of an elastic seal ring from the groove in which it is disposed upon being shifted relatively to a companion valve seat, to prevent or permit fluid flow around the seal from a source of pressure.

Another object of the invention is to provide a valve embodying an elastic seal ring in a ring groove, in which the seal ring does not become fluid cut as a result of being shifted across a fluid opening or passage, or to and from engagement with a companion valve seat.

A further object of the invention is to so dispose an elastic valve seal ring in a ring groove, and arrange it with respect to a source of fluid pressure, that the fluid pressure tends to maintain the ring in the groove rather than displace it therefrom.

Another object of the invention is to provide a valve that can be opened and closed under very high pressures without cutting out of the elastic seal ring or rings, or displacing such ring or rings from the ring groove or grooves in which they are located.

Yet another object of the invention is to provide a valve embodying one or more elastic seal rings that can be shifted between open and closed positions and under very high pressures a considerable number of times without cutting out the ring or rings.

Still a further object of the invention is to provide a valve that can be opened and closed under high pressures very easily and with the exertion of little effort, without cutting out of the elastic seal ring or its displacement from a ring groove in which it is disposed.

Yet a further object of the invention is to provide a valve that is hydraulically balanced when in closed position; so as to remain in such closed position without the application of external effort, and which is hydraulically unbalanced when in open position so as to remain in such open position.

Another object of the invention is to provide a valve in which the parts can swivel with respect to each other when the valve is open or closed, in order to preclude kinking or bending of a hose or other fluid line attached thereto.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a longitudinal section through one form of valve embodying the invention;

Fig. 2 is an enlarged fragmentary section of a portion of the valve device shown in Fig. 1, with the valve seal ring at the point of disengagement from, or engagement with, its companion seat;

Fig. 3 is a view similar to Fig. 2, illustrating the elastic seal ring fully disengaged from its seat;

Fig. 4 is a view similar to Figs. 2 and 3, disclosing the valve in partially open position;

Fig. 5 is a view similar to Fig. 4, illustrating the valve in a more fully open condition;

Fig. 6 is an enlarged cross-section taken along the line 6—6 on Fig. 1;

Fig. 7 is a longitudinal section, with parts in elevation, through another embodiment of the invention, with the valve parts occupying one relative position;

Fig. 8 is a view similar to Fig. 7, with the valve parts occupying another relative position;

Fig. 9 is an enlarged fragmentary longitudinal section of the device shown in Figs. 7 and 8, disclosing a seal ring on the point of moving across a fluid pressure inlet;

Fig. 10 is a view similar to Fig. 9, showing the seal ring in open position over a fluid inlet port;

Fig. 11 is an enlarged fragmentary longitudinal section through the exhaust portion of the valve device shown in Figs. 7 and 8, with a seal ring in closed position against its companion seat;

Fig. 12 is a view similar to Fig. 11, illustrating the seal ring in open or released position with respect to its companion seat;

Fig. 13 is a longitudinal section through still another embodiment of the invention, with the valve head disposed in closed position across its companion seat and seal ring;

Fig. 14 is an enlarged fragmentary section through a portion of the valve device shown in Fig. 13, disclosing the valve head moving out of engagement with respect to its companion elastic seal ring;

Fig. 15 is a view similar to Fig. 14, disclosing the valve head out of engagement with the companion seal ring.

In all forms of the invention disclosed, an elastic seal ring made of rubber or a rubber substitute is disposed in a ring groove for slidable sealing engagement against a companion cylindrical valve seat, in which position fluid under pressure cannot flow between the seal ring and seat. The cylindrical seat extends beyond its point of engagement with the seal ring, and such extended portion of the seat is on the low pressure side of the seal ring; so that the fluid pressure acting on the seal ring tends to force the latter into its companion ring groove, rather than displace it therefrom. When the seat and seal ring are moved relatively to each other toward an open position, the fluid pressure is effective to continue to urge and maintain the ring in its groove, until the ring engages the edge of the seat marking a terminal portion thereof, at which point the ring is on the verge of being moved out of engagement with the seat. A slight additional relative movement between the seal and seat moves the seal out of engagement with the seat, which then immediately allows the fluid under pressure to enter the ring groove on both sides of the seal ring, providing a balanced pressure all around the ring, and thereby providing no fluid forces tending to urge the seal ring out of the groove. Thus, when the seal ring is in an open position with respect to the intake portion of the valve, the fluid under pressure entering the valve through the intake or inlet acts substantially on all sides of the ring, resulting in no pressure differentials there-around tending to displace it from its companion groove. As soon as the ring is moved into engagement with its cylindrical seat, or into a closed position, the fluid inlet pressure is immediately effective to bear against one side of the ring and force it firmly into its groove and against the cylindrical seat. The mounting member in which the ring groove is provided ordinarily fits rather closely against the companion cylindrical seat; so as to provide insufficient annular clearance space into which the fluid pressure could force the elastic seal ring, even under very high operating conditions.

In the form of invention disclosed in Figs. 1 to 6, inclusive, an elongate valve body 10 is provided having an outlet passage 11. Such outlet end of the valve body may be threaded to receive a coupling (not shown), such as may be provided on an ordinary garden hose. A longitudinally movable valve member 12 is telescopically slidable within the valve body 10. This valve member has a threaded external portion 13 for the reception of a threaded coupling (not shown) for connecting the valve member with a source of fluid under pressure. This fluid will enter the central inlet passage 14 in the valve member, which extends a substantial distance toward the valve outlet 11. This inlet passage 14 communicates with a plurality of circumferentially spaced radial inlet ports 15 that open outwardly into an elongate circumferential groove 16 formed in the inner wall of the valve body 10.

On opposite sides of the groove 16, the valve body provides cylindrical valve seats 17, 18 for cooperation with the cylindrical periphery 19 of the valve member, and also for slidable engagement with elastic seal rings 20, 21 disposed in ring grooves 22, 23 in the valve member. When the valve member 12 is shifted inwardly of the valve body 10, a forward seal ring 21 is disposed in engagement with the cylindrical valve seat 18 forwardly of the circumferential groove 16, whereas the rearward seal ring 20 is disposed in its ring groove 22 and slidably seals against the cylindrical seat 17 at the opposite or rearward side of the circumferential groove 16.

Each seal ring 20, 21 may be made of rubber or rubber-like material, being of round, or circular, cross-section, and disposed within a ring groove 22 or 23 which is rectangular in cross-section, as disclosed in Figs. 1 to 5, inclusive. The valve member 12 has a cylindrical external surface 19 of extended length on opposite sides of each ring groove. The forward cylindrical surface 19 preferably makes a sliding fit with the forward cylindrical valve seat 18, merging into a frusto-conical or tapered surface 24 formed on the tapered valve head portion 25 of the valve member, which has the purpose, as explained hereinafter, of controlling the rate of flow of fluid through the valve device.

The valve member 12 may occupy an inward position, in which the longitudinally spaced seal rings 20, 21 are disposed on opposite sides of the circumferential inlet groove 16 and in sealing engagement with the cylindrical valve seats 17, 18, in which position fluid in the inlet passage ports 15 and circumferential groove 26 is prevented from passing into the outlet 11 because of the sealing engagement of the forward seal ring 21 against its companion seat 18. When in this position, the rearward seal ring 20 prevents leakage of fluid in a rearward direction out of the circumferential groove 16. Such inward position of the valve member 12 is determined by a stop device in the form of a laterally extending stop screw 26 threaded into the valve body 10 and received within a circumferential, elongate groove 27 in the exterior of the valve member 12, the stop screw engaging the rearward end wall 28 of the groove 27.

When the valve member 12 is pulled in an outward direction with respect to the valve body 10, the forward seal ring 21 is moved out of engagement with the forward cylindrical valve seat 18 and into alignment with the circumferential body groove 16, allowing fluid to flow from the inlet passage 14 and inlet ports 15 into the body groove 16, and around the seal ring 21 and valve head 25 into the body outlet 11. When the valve member 12 is moved outwardly to its fullest extent, as determined by engagement of the forward wall 29 of the groove with the stop screw 26, the valve is in its fully open position, such as illustrated in Fig. 5. When moved partially inwardly, the fluid flow may be throttled by the closer spacing of the tapered valve head surface 24 from the sealing edge 30 of the forward cylindrical valve seat 18. The extent of this spacing, of course, increases as the valve member 12 and its head 25 are moved in a rearward direction, allowing a greater fluid flow through the valve. Upon moving the valve member 12 inwardly to a greater extent from the position shown in Fig. 4, the flow can be throttled extensively until the forward seal ring 21 again engages the cylindrical seat 18, whereupon the flow is entirely arrested.

It is to be noted that when the valve is in the closed position disclosed in Fig. 1, the fluid pressure acting on the valve member 12 is completely balanced, and there are no fluid or hydraulic forces tending to hold the valve member 12 in closed position, or tending to shift it from open position. This is due to the fact that the cylindrical seats 17, 18 on both sides of the circumferential body groove 16 are of equal diameter. However, when the valve is in open position, such as disclosed in Figs. 4 and 5, a hydraulically unbalanced condition prevails, in which the fluid pressure in the outlet 11 tends to shift the valve member 12 to fully open position, and to maintain it in such position.

It is to be noted that the valve member 12 can rotate with respect to the valve body 10, without affecting the control of fluid. The stop screw 26 and external groove 27 in the valve member form a swivel connection between the valve member 12 and body 10, allowing the latter parts to rotate or swivel with respect to each other. Despite such rotation, the sealing effectiveness of the elastic O rings 20, 21 against their companion cylindrical seats 17, 18 remains undisturbed; the valve being capable of remaining in closed position. For that matter, the operation of the valve when in partial or fully open position also remains undisturbed. Because of the swiveled arrangement, a garden hose or other line attached to the outlet 11 cannot become kinked, inasmuch as the valve body 10 can rotate on the valve member 12 if necessary, to prevent or eliminate any kinking or bending tendencies of the hose.

The forward seal ring 21 is so disposed in its companion ring groove 23, and is so related with respect to the inlet 16 and the cylindrical valve seat 18 that the inlet pressure at no time tends to force the seal ring out of its groove, despite the fact that the inlet pressure may be exceedingly high; for example, of the order of 5,000 to 10,000 p.s.i. As stated above, the cylindrical surface 19 on the valve member 12 in advance of the ring groove 23 makes a relatively close sliding fit with the forward cylindrical valve seat 18, providing only a relatively small annular clearance space 31 into which the elastic seal ring 21 may be forced. As a result, the forward end wall 32 of the ring groove serves to provide an effective barrier for the elastic seal ring 21 when the latter is subjected to high pressures. It is also to be noted that the circumferential sealing edge 30 between the forward cylindrical seat 18 and the circumferential body groove 16 is relatively sharp and abrupt. As disclosed, the end wall 33 of the body groove is substantially at right angles to the cylindrical valve seat 18, although other angles would be effective; so long as the point of juncture or corner 31 between the end wall 33 and the cylindrical valve seat 18 is not substantially tapered or rounded.

As disclosed in Fig. 1, the forward seal ring 21 is in closed position against its companion seat 18. The fluid pressure in the circumferential body groove 16 can enter the ring groove 23, forcing the seal ring 21 in a forward direction against the end wall 32 of the ring groove and outwardly into sealing engagement with the cylindrical seat 18. The fluid pressure is thus tending to hold the seal ring 21 within its groove 23, the clearance space 31 between the head 25 and cylindrical seat 18 being insufficient in size to allow displacement of the elastic seal ring material thereinto.

As the valve member 12 and seal ring 21 are moved toward a valve opening position, or to the left, as disclosed in Figs. 1 to 5, the pressure tends to maintain the seal ring 21 in its groove 23 and in engagement with the cylindrical seat 18, until the condition illustrated in Fig. 2 is reached, at which point the periphery of the seal ring 21 is in engagement with the edge or corner 30 marking the termination of the cylindrical seat 18 and the beginning of the circumferential body groove 16. At this point, the fluid pressure, as illustrated by the arrows in Fig. 2, is still acting on the seal ring 21, to hold it in its groove 23 against the bottom 35 and forward wall 32 of the groove, and also against the sealing edge or corner 30. However, an exceedingly slight additional movement of the valve member 12 and seal ring 21 to the left will break the sealing engagement between the O ring 21 and the sealing edge 30, which immediately allows the high fluid inlet pressure to then pass between the sealing edge 30 and ring 21 to the forward side of the ring, in which position the high inlet pressure is acting on all sides of the ring. There is, accordingly, no fluid pressure differentials acting on the ring 21 when it has moved out of engagement with its companion cylindrical seat 18, tending to force or blow the ring out of the groove. This latter condition is illustrated in Fig. 3. Of course, as the valve member 12 is moved further to the left, or to valve opening position, the fluid merely flows around the ring 21 and out between the tapered head 25 and the cylindrical valve seat 18, to exhaust from the body outlet 11.

When the valve member 12 is moved in the opposite direction, or to the right, the fluid pressure surrounds the elastic O ring 21, and there are no hydraulic forces tending to shift it out of its groove 23. However, when the valve member 12 has been moved to the right sufficiently to bring the periphery of the O ring 21 into engagement with the sealing edge 30 once again, an immediate pressure differential is established, the inlet pressure forcing the ring 21 to the right and firmly into engagement with the sealing edge portion 30 of the cylindrical seat 18 and against the bottom and forward walls 35, 32 of the ring groove 23. A continuation of the movement of the valve member 12 inwardly of the valve body 10, or to the right, merely slides the seal ring 21 along its companion cylindrical seat 18.

It is thus apparent that the fluid under pressure is either in a balanced state with respect to the seal ring 21, when the latter is out of engagement with the seat 18; or is acting on the seal ring 21, when the latter is in engagement with its seat 18, to maintain such engagement and to hold the seal ring in its ring groove 21. In addition, the fluid pressure at no time acts on the seal ring 21 to force it out of the ring groove 23; so as to move it over sharp edges, such as the sealing edge 30, which would provide a cutting action on the seal ring and shorten its life to a considerable extent.

The importance of the relationship between the location of the seal ring 21 and its groove 23 between the high pressure end 16 of the valve and the cylindrical seat 18 can be appreciated if one were to place the high pressure end of the valve at the present outlet portion of the body. With this arrangement and with the parts located in the position shown in Fig. 2, the fluid under high pressure would be acting in the opposite direction to that shown by the arrows, passing through the clearance space 31 and into the groove 23, deforming the seal ring 21 and tending to blow it out into the enlarged circumferential groove portion 16 of the body 10. Under such assumed conditions, the movement of the valve head toward the valve seat 18, or to closed position, would result in harm to the seal ring 21. Since the seal ring 21 would engage the sealing edge 30, the fluid pressure bearing against the right-hand portion of the seal ring, and flattening it against the rear wall 36 of the ring groove 23, would cause the seal ring to expand outwardly into the circumferential body groove 16, whereupon, it would be cut as it was forced over the relatively sharp sealing edge 30.

With the reverse arrangement to that just described, and as pursued by applicant, the fluid pressure is availed of to hold the elastic seal ring 21 in its groove 23, and to preclude any fluid cutting, since the pressure tends to urge the ring 21 further into its groove, rather than to deform it laterally; so as to present a laterally extended portion that could be mechanically cut by the sealing edge.

In the form of invention disclosed in Figs. 7 to 12, inclusive, a piston type of valve is illustrated, including an elongate body 40 in which a piston member 41 is slidable. The piston and body members 40, 41, together with the seal rings 42, 43, 44, 45, control flow of fluid between an inlet 46, threaded into the body 40, and an outlet 47 threaded into the body. Fluid can also pass from the outlet 47 into the body, and then pass through an exhaust line 48 to the atmosphere. The inlet line 46 communicates with one or more inlet ports 49 in the valve body 40 opening into its cylindrical bore or passage 50. Similarly, the outlet line 47 communicates with one or more outlet ports 51 opening into the body bore 50 and the exhaust line communicates with an exhaust port 51a.

The piston 41 is provided with cylindrical end portions 52, 53 slidable along the inner wall of the body, and serving to guide the piston in its movements longitudinally of the body. Between the end portions, the piston has a reduced diameter portion 54 around which the fluid can flow between the various body ports, depending upon the position of the piston valve member 41.

One of the end portions 52 of the piston valve has a pair of spaced ring grooves 54, 55 containing elastic O ring seals 42, 43, which slidably seal against the cylindrical wall of the body. These seal rings are longitudinally spaced; so as to be disposed on opposite sides of the inlet port 49, to close the same, as shown in Fig. 7, or both to be disposed on one side of the inlet port 49, to open the same, as disclosed in Fig. 8.

On opposite sides of the exhaust port 51a, the body is provided with a pair of internal ring grooves 56, 57, in which the elastic O ring seals 44, 45 are provided for slidable sealing engagement against the cylindrical seating portion 53 of the piston valve at the right thereof, as seen in the drawings. When the cylindrical portion 53 engages both seal rings, as shown in Fig. 8, the exhaust port 51a is closed, and when it has been shifted to the right, to be in slidable sealing engagement with only one of the body seal rings 45, the exhaust port 51a is open.

The valve seal rings 42, 43, 44, 45, cylindrical portions 52, 53 of the piston, and intermediate reduced diameter portion 54 of the piston are so related to each other and to the spacing of the inlet, outlet and exhaust ports 49, 51, 51a that the outlet port 51 can either be placed in communication with the exhaust port 51a or with the inlet port 49. As shown in Fig. 7, the piston valve member 41 is disposed to the right, as determined by engagement of its end stop portion 58 with the end of the body 40, in which position the piston seal rings 42, 43 are disposed on opposite sides of the inlet port 49, closing the latter. At the same time, the reduced diameter portion 54 of the piston is disposed across the outlet and exhaust ports 51, 51a, establishing communication between the two. At this time, the cylindrical piston seat 53 engages the right body seal ring 45 only.

When the piston valve member 41 is moved to the left, with its right stop boss 59 engaging the right end of the body 40, the cylindrical piston seat 53 is disposed across the exhaust port 51a and in sealing engagement with both of the exhaust seal rings 44, 45, closing the exhaust port. At the same time, both of the piston seal rings 42, 43 have been disposed to the left of the inlet port 49 and the reduced diameter portion 54 of the piston 41 is disposed across both the inlet and outlet ports 49, 51, allowing fluid communication between the two.

The right piston seal ring 43 engages the cylindrical seat 50 of the body when disposed to the right of the inlet port 49, and cannot be displaced from its companion ring groove 55 by the inlet fluid pressure, since such fluid pressure acts upon the ring 43 and urges it against the right wall 60 of the ring groove, the bottom 61 of the ring groove, and against the cylindrical body seat 50. The clearance space 62 between the enlarged portion 52 of the piston to the right of the ring groove 55 and the cylinder body seat 50 is insufficient in lateral extent to provide sufficient clearance space into which the elastic seal ring can be extruded or forced by fluid pressures, even of high order, such as 5,000 to 10,000 p.s.i.

When the piston valve 41 is shifted from the position disclosed in Fig. 7 to the position disclosed in Fig. 8, the piston seal ring 43 is shifted across the inlet port 49. Despite such shifting, the high fluid pressure still tends to maintain the seal ring 43 in its groove 55, and does not tend to expand it laterally outwardly; so that a cutting action will occur as it moves across the port 49. In Fig. 9, the seal ring 43 is on the verge of passing from engagement with the cylindrical seat 50 at the right of the port 49 and across the port. At this point 63, the pressure is still tending to urge the ring 43 inwardly, and also to the right against the bottom and right walls 61, 60 of the ring groove 55, and also against the cylindrical seat 50 to the right of the port 49. An exceedingly slight further movement of the piston 41 and seal ring 43 to the left from the position shown in Fig. 9 will move the ring slightly across the port 49, allowing the fluid pressure to get on the right side of the ring 43, and thereby produce an equalized pressure condition all around the ring, such as shown in Fig. 10. With an equalized pressure around the ring, there are no pressure forces tending to expand or deform the ring 43 laterally outward and to force it into the port 49, which might result in a mechanical cutting action being imposed upon the seal ring. As the piston 41 and seal ring 43 move across the port 49, there is no pressure differential acting on the seal ring. Upon the periphery of the seal ring engaging the left edge 64 of the port, the pressure is prevented from then getting on the left side of the ring and immediately acts upon the right side of the ring 43, urging it into its groove 55 against the bottom and left groove walls 61, 65, and also against the cylindrical body seat 50 to the left of the port; whereupon continued movement of the piston 41 and seal ring 43 to the left merely slides the seal ring along the cylindrical seat 50 which it engages.

The movement of the piston 41 to the right from the position just described will reverse the foregoing action. When the seal ring 43 just leaves the left edge 64 of the port 49, the pressure is balanced around the entire ring, and this balanced pressure condition remains during the entire travel of the ring across the port, and until it reengages the cylindrical seat edge or corner 63 at the right of the port, whereupon the pressure again forces the seal ring 43 inwardly of its groove and against the cylindrical seat 50 at the right of the port.

A similar action to that just described occurs when the enlarged piston portion 53 at the right of the piston moves into and out of sealing engagement with the body ring 44 to the left of the exhaust port 51a. As disclosed in Fig. 7, the outlet port 51 is a source of fluid under pressure that passes around the small diameter piston portion 54 and into the exhaust port 51a. When this condition pertains, the body seal ring 44 is in a balanced state, since the pressure is uniform therearound. When the piston 41 is moved to the left and to the position disclosed in Fig. 8, the inlet pressure is acting upon the body seal ring 44. But this pressure urges the seal ring 44 outwardly into its groove 56 and against the right-hand ring groove wall 70, as well as against the base 71 of the groove and the cylindrical piston seat 53.

When the piston 41 is moved to the right from the position shown in Fig. 8, to open the port 51a, the pressure is, at first still effective to hold the body ring 44 in its groove 56 and against the seat 53. When the relatively sharp sealing edge or corner 72 marking the terminus of the cylindrical seat 53 engages the innermost surface of the O ring 44, the pressure is still effective to urge and maintain the seal ring in its groove and against the periphery of the corner 72, this condition being depicted in Fig. 11. As shown in Fig. 12, a slight additional movement of the piston 41 to the right will break the seal of the ring 44 with the corner 72, and immediately allow the higher pressure in the body 40 around the reduced diameter portion 54 of the piston to pass to the right of the body ring 44, equalizing the pressure therearound and precluding any unbalanced pressure forces from being present, tending to shift the ring out of the groove 56, or to deform it inwardly into the body bore.

When the piston 41 is shifted in the opposite direction, the fluid pressure acting on the body ring 44 is uniform therearound, until the corner 72 again engages the inner periphery of the seal ring, whereupon the pressure forces the ring 44 more firmly into the groove 56 and against the cylindrical seat 53. A continuation of the movement of the piston 41 to the left merely results in relatively effortless sliding of the cylindrical piston seat 53 along the seal ring 44.

The valve illustrated in Figs. 7 to 12, inclusive, is in a balanced condition, despite the presence of very high pressures. The piston 41 can be moved to its various operating positions within the body 40 with very little effort and without there being any tendency for the various seal rings to be displaced out of their grooves or to be shifted by pressure to positions in which a cutting action can take place on them.

The valve device disclosed in Figs. 13 to 15 is illustrated in my parent application, Serial No. 197,542, above referred to. In this device, a valve body 80 has external ribs 81 thereon, and is releasably secured to a tubular valve housing 82 by one or more shear screws 83 passing through the housing and threaded into a rib or ribs. Fluid can pass upwardly between the ribs 81 and the valve body 80 and housing 82, flowing laterally inward through a plurality of body ports 84, thence passing upwardly through a generally cylindrical valve seat 85 in the body and into the upper cylindrical portion 86 of the body 80, which has a substantially greater diameter than the cylindrical valve seat 85. Leakage between the housing 82 and the exterior of the upper body portion 86 is prevented by a suitable side seal 87 in the housing engaging the exterior of the upper body portion.

The ability of the fluid to pass upwardly in the manner just described is dependent upon the position of a valve head 88, which has a cylindrical periphery adapted to be disposed within the cylindrical body seat 85. When in this position, leakage around the valve head 88 is prevented by engagement of its cylindrical periphery with an elastic seal or O ring 89 disposed in a ring groove 90 in the valve seat 85. This ring is of round cross-section, being received within a groove having opposed side walls 91, 92 that may be parallel to one another, or which may converge toward each other in a direction toward the axis of the valve device, to insure retention of the seal ring 89 in the groove 90.

The valve head 88 is secured to, or is made integral with, a depending rod 93 attached to, or integral with, a lower piston 94 slidable within a cylinder 95 in the valve body 80, which has a closed lower end 96. Leakage around the periphery of the piston is prevented by a suitable seal ring 97 disposed in a piston groove 98 and slidably engaging the wall of the cylinder 95.

The cylindrical surface of the valve head 88 terminates in a relatively sharp lower corner 99 for cooperation with the seal ring 89, in much the same manner as the body seal ring 44 cooperates with the right-hand cylindrical portion 53 of the piston valve illustrated in Figs. 7, 8, 11 and 12. The fluid under pressure acts on the underside of the valve head 88, lifting it upwardly toward the broken line position disclosed in Fig. 13. So long as the seal ring 89 is in engagement with the cylindrical periphery or seat of the valve head 88, the fluid pressure tends to maintain the seal ring in the groove 90 and in engagement with the cylindrical periphery of the head. However, when the lower sealing edge 99 of the head moves upwardly out of engagement with the seal ring 89, the fluid pressure around the latter is immediately balanced; so that there is no tendency for its being blown or forced out of the ring groove 90 by any fluid pressure differentials (Fig. 15).

Similarly, when the valve head 88 moves downwardly, its lower edge or corner 99 first comes into contact with the seal ring 89, causing the pressure to act on the underside of the seal ring, forcing it upwardly against the upper and bottom walls 91, 100 of the ring groove 90, and pressing it against the cylindrical periphery of the head, whereupon, the head 88 may be shifted downwardly, sliding along the seal ring.

It is, therefore, apparent that valve devices have been provided in which seal rings may be moved into and out of engagement with their companion cylindrical seats, and across ports, without there being any tendency for the fluid under pressure to blow or force the rings out of their companion ring grooves. In addition, there is no pressure action available tending to force the seal rings into ports or other open spaces when the seal rings move into and out of engagement with their companion cylindrical seats. Accordingly, there is no mechanical cutting actions imposed upon the seal rings when being moved relative to their companion seats.

The inventor claims:

1. In a valve: first and second valve members slidable one within the other; said first member having a fluid outlet and a cylindrical seat communicating with said outlet and terminating in a shoulder normal to said seat to provide a sharp, abrupt circumferential sealing edge; said first member also having a circumferential fluid pressure inlet groove communicable with said seat and bounded at one end by said shoulder and at an opposite end by a second shoulder fixed to said first member; said second member having a fluid inlet communicating with said circumferential groove and also having a circumferential ring groove; and an elastic seal ring of substantially round cross-section in said ring groove movable into and out of slidable sealing engagement with said cylindrical seat and said edge upon movement of said second member relative to said first member; said elastic seal ring, when out of engagement with said cylindrical seat and said edge, permitting fluid to flow from said inlet to said inlet groove and along said seat into said outlet; the cross-sectional diameter of said seal ring being substantially equal to the depth of said circumferential groove and the radial distance between the base of said circumferential groove and cylindrical seat, the width of said circumferential groove being no smaller than the cross-sectional diameter of said seal ring, the portion of said seal ring which engages said seat being equal in diameter to the diameter of said seat when said seal ring is disengaged from said seat.

2. In a valve: an outer member having a fluid outlet and a cylindrical seat communicating with said outlet and terminating in a shoulder normal to said seat to provide a sharp, abrupt circumferential sealing edge; said outer member also having a circumferential fluid pressure inlet groove communicable with said seat and bounded at one end by said shoulder and at an opposite end by a second shoulder fixed to said outer member; an inner member slidable in said outer member and having a fluid inlet communicating with said circumferential groove and also having a circumferential ring groove; an elastic seal ring of substantially round cross-section in said ring groove movable into and out of slidable sealing engagement with said cylindrical seat and said edge upon relative longitudinal movement between said inner and outer members; said elastic seal ring, when out of engagement with said cylindrical seat and said edge, permitting fluid to flow from said inlet into said inlet groove and through said seat into said outlet; the cross-sectional diameter of said seal ring being substantially equal to the depth of said circumferential groove and the radial distance between the base of said circumferential groove and cylindrical seat, the width of said circumferential groove being no smaller than the cross-sectional diameter of said seal ring, the outside diameter of said seal ring being equal to the diameter of said cylindrical seat when said seal ring is disengaged from said seat.

3. In a valve: first and second valve members slidable one within the other; said first member having a fluid outlet and a cylindrical seat communicating with said outlet and terminating in a shoulder normal to said seat to provide a sharp, abrupt circumferential sealing edge; said first member also having a circumferential fluid pressure inlet groove communicable with said seat and bounded at one end by said shoulder and at an opposite end by a second shoulder fixed to said first member; said second member having a fluid inlet communicating with said circumferential groove and also having a circumferential ring groove; said second member making a close sliding fit with said cylindrical seat at the low pressure side of said ring groove; and an elastic seal ring of substantially round cross-section in said ring groove movable into and out of slidable sealing engagement with said cylindrical seat and said edge upon relative longitudinal movement between said members; said elastic seal ring, when out of engagement with said cylindrical seat and said edge, permitting fluid to flow from said inlet to said inlet groove and along said seat into said outlet; the cross-sectional diameter of said seal ring being substantially equal to the depth of said circumferential groove and the radial distance between the base of said circumferential groove and cylindrical seat, the width of said circumferential groove being no smaller than the cross-sectional diameter of said seal ring, the portion of said seal ring which engages said seat being equal in diameter to the diameter of said seat when said seal ring is disengaged from said seat.

4. In a valve: an outer member having a fluid outlet and a cylindrical seat communicating with said outlet and terminating in a shoulder normal to said seat to provide a sharp, abrupt circumferential sealing edge; said outer member also having a circumferential fluid pressure inlet groove communicable with said seat and bounded at one end by said shoulder and at an opposite end by a second shoulder fixed to said outer member; an inner member slidable within said outer member and having a fluid inlet communicating with said circumferential groove and also having a circumferential ring groove; said inner member making a close sliding fit with said cylindrical seat at the low pressure side of said ring groove; and an elastic seal ring of substantially round cross-section in said ring groove movable into and out of slidable sealing engagement with said cylindrical seat and said edge upon relative longitudinal movement between said members; said elastic seal ring, when out of engagement with said cylindrical seat and said edge, permitting fluid to flow from said inlet into said inlet groove and through said seat into said outlet; the cross-sectional diameter of said seal ring being substantially equal to the depth of said circumferential groove and the radial distance between the base of said circumferential groove and cylindrical seat, the width of said circumferential groove being no smaller than the cross-sectional diameter of said seal ring, the outside diameter of said seal ring being equal to the diameter of said cylindrical seat when said seal ring is disengaged from said seat.

5. In a valve: first and second valve members slidable one within the other; said first member having a fluid outlet and a cylindrical seat communicating with said outlet and terminating in a shoulder normal to said seat to provide a sharp, abrupt circumferential sealing edge; said first member also having a circumferential fluid pressure inlet groove communicable with said seat and bounded at one end by said shoulder and at an opposite end by a second shoulder fixed to said first member; said second member having a fluid inlet communicating with said circumferential groove throughout the entire length of said groove and also having a circumferential ring groove; and an elastic seal ring of substantially round cross-section in said ring groove movable into and out of slidable sealing engagement with said cylindrical seat and said edge upon movement of said second member relative to said first member; said elastic seal ring, when out of engagement with said cylindrical seat and said edge, permitting fluid to flow from said inlet to said inlet groove and along said seat into said outlet; the cross-sectional diameter of said seal ring being substantially equal to the depth of said circumferential groove and the radial distance between the base of said circumferential groove and cylindrical seat, the width of said circumferential groove being no smaller than the cross-sectional diameter of said seal ring, the portion of said seal ring which engages said seat being equal in diameter to the diameter of said seat when said seal ring is disengaged from said seat; said second member having a tapered head movable longitudinally with respect to said first member to determine the flow of fluid between said head and said sealing edge when said seal ring is out of engagement from said seat.

6. In a valve: an outer member having a fluid outlet and a cylindrical seat communicating with said outlet and terminating in a shoulder normal to said seat to provide a sharp, abrupt circumferential sealing edge; said outer member also having a circumferential fluid pressure inlet groove communicable with said seat and bounded at one end by said shoulder and at an opposite end by a second shoulder fixed to said outer member; an inner member slidable in said outer member and having a fluid inlet communicating with said circumferential groove throughout the entire length of said groove and also having a circumferential ring groove; and an elastic seal ring of substantially round cross-section in said ring groove movable into and out of slidable sealing engagement with said cylindrical seat and said edge upon relative longitudinal movement between said inner and outer members; said elastic seal ring, when out of engagement with said cylindrical seat and said edge, permitting fluid to flow from said inlet into said inlet groove and through said seat into said outlet; the cross-sectional diameter of said seal ring being substantially equal to the depth of said circumferential groove and the radial distance between the base of said circumferential groove and cylindrical seat, the width of said circumferential groove being no smaller than the cross-sectional diameter of said seal ring, the outside diameter of said seal ring being equal to the diameter of said cylindrical seat when said seal ring is disengaged from said seat; said second member having a tapered head movable longitudinally with respect to said first member to determine the flow of fluid between said head and said sealing edge when said seal ring is out of engagement from said seat.

7. In a valve: first and second valve members slidable one within the other; said first member having a fluid outlet and a first cylindrical seat terminating in a shoulder normal to said seat to provide a sharp, abrupt circumferential sealing edge, said first member having a second cylindrical seat longitudinally spaced from said first cylindrical seat; said first member also having a circumferential fluid pressure inlet groove bounded at one end by said shoulder and at an opposite end by a second shoulder fixed to said first member, said inlet groove being located between said cylindrical seats; said second member having a fluid inlet communicating with said circumferential groove and also having a circumferential ring groove; an elastic seal ring of substantially round cross-section in said ring groove movable into and out of slidable sealing engagement with said first cylindrical seat and said edge upon movement of said second member relative to said first member; said second member having a tapered head movable longitudinally with respect to said first member to determine the flow of fluid between said head and said sealing edge when said seal ring is out of engagement from said first cylindrical seat; and slidable seal means between said second member and said second cylindrical seat; said cylindrical seats being of substantially equal diameter; the cross-sectional diameter of said seal ring being substantially equal to the depth of said circumferential groove and the radial distance between the base of said circumferential groove and first cylindrical seat, the width of said circumferential groove being no smaller than the cross-sectional diameter of said seal ring, the portion of said seal ring which engages said first cylindrical seat being equal in diameter to the diameter of said first cylindrical seat when said seal ring is disengaged from said first cylindrical seat.

8. In a valve: an outer member having a fluid outlet and a first cylindrical seat terminating in a shoulder normal to said seat to provide a sharp, abrupt circumferential sealing edge; said outer member having a second cylindrical seat longitudinally spaced from said first cylindrical seat; said outer member also having a circumferential fluid pressure inlet groove bounded at one end by said shoulder and at an opposite end by a second shoulder fixed to said outer member, said inlet groove being located between said cylindrical seats; an inner member slidable in said outer member and having a fluid inlet communicating with said circumferential groove and also having a circumferential ring groove; an elastic seal ring of substantially round cross-section in said ring groove movable into and out of slidable sealing engagement with said first cylindrical seat and said edge upon relative longitudinal movement between said inner and outer members; said second member having a tapered head movable longitudinally with respect to said first member to determine the flow of fluid between said head and said sealing edge when said seal ring is out of engagement from said first cylindrical seat; said second member having a seal ring slidably engaging said second cylindrical seat; said cylindrical seats being of substantially equal diameter; the cross-sectional diameter of said seal ring being substantially equal to the depth of said circumferential groove and the radial distance between the base of said circumferential groove and first cylindrical seat, the width of said circumferential groove being no smaller than the cross-sectional diameter of said seal ring, the outside diameter of said seal ring being equal to the diameter of said first cylindrical seat when said seal ring is disengaged from said first cylindrical seat.

References Cited in the file of this patent

UNITED STATES PATENTS

| | | |
|---|---|---|
| 1,706,072 | Rieger | Mar. 19, 1929 |
| 2,115,383 | Christensen | Apr. 26, 1938 |
| 2,360,733 | Smith | Oct. 17, 1944 |

(Other references on following page)

UNITED STATES PATENTS

| | | |
|---|---|---|
| 2,445,505 | Ashton | July 20, 1948 |
| 2,496,036 | Christensen | Jan. 31, 1950 |
| 2,501,661 | Christensen | Mar. 28, 1950 |
| 2,505,410 | Klaas | Apr. 25, 1950 |
| 2,506,111 | Saint | May 2, 1950 |
| 2,524,142 | Seeloff | Oct. 3, 1950 |

FOREIGN PATENTS

| | | |
|---|---|---|
| 177,010 | Switzerland | of 1935 |
| 442,659 | Italy | of 1948 |
| 615,974 | Great Britain | of 1949 |

OTHER REFERENCES

Handbook on Synthetic Rubber Packings, E. F. Houghton & Co., 1st edition, 1947 (page 73). (Copy in Div. 52.)